(12) United States Patent
Sahm

(10) Patent No.: US 9,677,546 B2
(45) Date of Patent: Jun. 13, 2017

(54) SOLAR ENERGY DRIVEN SYSTEM FOR HEATING, COOLING, AND ELECTRICAL POWER GENERATION INCORPORATING COMBINED SOLAR THERMAL AND PHOTOVOLTAIC ARRANGEMENTS

(75) Inventor: Michael K. Sahm, Avon, CT (US)

(73) Assignee: CARRIER CORPORATION, Farmington, CT (US)

( * ) Notice: Subject to any disclaimer, the term of this patent is extended or adjusted under 35 U.S.C. 154(b) by 129 days.

(21) Appl. No.: 14/127,310

(22) PCT Filed: Jun. 4, 2012

(86) PCT No.: PCT/US2012/040690
§ 371 (c)(1),
(2), (4) Date: Dec. 18, 2013

(87) PCT Pub. No.: WO2012/177379
PCT Pub. Date: Dec. 27, 2012

(65) Prior Publication Data
US 2014/0125060 A1    May 8, 2014

Related U.S. Application Data

(60) Provisional application No. 61/499,411, filed on Jun. 21, 2011.

(51) Int. Cl.
*F03G 6/06* (2006.01)
*F01D 15/10* (2006.01)
(Continued)

(52) U.S. Cl.
CPC ............... *F03G 6/06* (2013.01); *F01D 15/10* (2013.01); *F03G 6/001* (2013.01); *F03G 6/065* (2013.01);
(Continued)

(58) Field of Classification Search
CPC . F01D 15/10; F03G 6/001; F03G 6/06; F03G 6/065; F03G 6/067; F22B 1/006; F25B 27/002; Y02B 10/20; Y02E 10/46
See application file for complete search history.

(56) References Cited

U.S. PATENT DOCUMENTS

| 4,771,763 A | * | 9/1988 | Wetzel, Jr. ................. F24J 2/42 126/636 |
| 5,123,247 A | * | 6/1992 | Nelson ....................... F03G 6/06 126/620 |

(Continued)

FOREIGN PATENT DOCUMENTS

| CN | 201340043 Y | 11/2009 |
| CN | 101806445 A | 8/2010 |
| WO | 2010026437 A2 | 3/2010 |

OTHER PUBLICATIONS

International Preliminary Report on Patentability; PCT/US2012/040690; issued Dec. 2, 2014; 7 pages.

(Continued)

*Primary Examiner* — Tulsidas C Patel
*Assistant Examiner* — S. Mikailoff
(74) *Attorney, Agent, or Firm* — Cantor Colburn LLP

(57) ABSTRACT

A solar energy driven power generation system includes a solar energy receiver configured to collect solar energy. A vapor generator is operably connected to the solar energy receiver. A vapor turbine is operably connected to the vapor generator and is configured to be driven by a flow of vapor from the vapor generator. An electrical power generator is operably connected to the vapor turbine and driven thereby. A thermal conditioning system is operably connected to the vapor turbine and is driven by a flow of output vapor or hot liquid from the vapor turbine. A method of power generation includes collecting solar thermal energy and generating vapor utilizing the solar thermal energy. A vapor turbine is (Continued)

driven by the vapor and electrical power is produced via the rotation of the vapor turbine. Output vapor from the vapor turbine is utilized to drive a thermal conditioning system.

10 Claims, 3 Drawing Sheets

(51) Int. Cl.
*F25B 27/00* (2006.01)
*F03G 6/00* (2006.01)
*F22B 1/00* (2006.01)

(52) U.S. Cl.
CPC .............. *F03G 6/067* (2013.01); *F22B 1/006* (2013.01); *F25B 27/002* (2013.01); *Y02B 10/20* (2013.01); *Y02E 10/46* (2013.01)

(56) References Cited

U.S. PATENT DOCUMENTS

| | | | | |
|---|---|---|---|---|
| 5,419,135 A * | 5/1995 | Wiggs | ..................... | F02G 1/043 60/641.15 |
| 5,911,684 A * | 6/1999 | Shnell | ................. | E21B 41/0085 422/212 |
| 5,974,804 A * | 11/1999 | Sterling | .................. | B60R 16/03 60/645 |
| 6,062,029 A * | 5/2000 | Doe | ........................ | F03G 6/065 60/641.15 |
| 6,080,927 A * | 6/2000 | Johnson | ........................ | 136/248 |
| 6,981,377 B2 * | 1/2006 | Vaynberg | ................ | F01K 25/08 60/641.11 |
| 6,996,988 B1 * | 2/2006 | Bussard | .................... | F01K 3/12 60/641.15 |
| 9,099,591 B1 * | 8/2015 | Gurin | .................... | H01L 31/052 136/259 |
| 2004/0055300 A1 * | 3/2004 | Lawheed | ................ | F01C 1/123 60/641.8 |
| 2005/0198959 A1 * | 9/2005 | Schubert | .................... | F03G 6/00 60/641.8 |
| 2007/0084208 A1 * | 4/2007 | Goldman | ........................ | 60/698 |
| 2008/0289334 A1 * | 11/2008 | Orosz | .................... | F03G 6/067 60/641.8 |
| 2009/0113892 A1 * | 5/2009 | Chen | ....................... | F03G 6/065 60/641.8 |
| 2009/0126364 A1 * | 5/2009 | Mills | ....................... | F01K 9/003 60/641.8 |
| 2009/0179429 A1 * | 7/2009 | Ellis | .......................... | F01K 3/12 290/1 R |
| 2009/0228150 A1 * | 9/2009 | Alston | ..................... | F25B 27/00 700/276 |
| 2009/0260359 A1 * | 10/2009 | Palkes | ....................... | F01K 3/06 60/641.8 |
| 2010/0024805 A1 * | 2/2010 | Raymond | ................ | F24J 2/067 126/683 |
| 2010/0205963 A1 * | 8/2010 | Ammar | ..................... | 60/641.15 |
| 2010/0218496 A1 * | 9/2010 | Miles | ..................... | F02G 1/055 60/517 |
| 2010/0294266 A1 * | 11/2010 | Fung | ......................... | F24J 2/14 126/688 |
| 2011/0048502 A1 * | 3/2011 | Kikinis et al. | ................ | 136/248 |
| 2011/0049992 A1 * | 3/2011 | Sant'Anselmo | ........ | F03D 1/005 307/64 |
| 2011/0056219 A1 * | 3/2011 | Avery | ..................... | F25B 27/02 62/79 |
| 2011/0100005 A1 * | 5/2011 | Sampson | ............. | G05B 13/021 60/641.8 |
| 2011/0131988 A1 * | 6/2011 | Sampson | ............. | G05B 13/021 60/641.1 |
| 2011/0272003 A1 * | 11/2011 | Elazari | .................... | H02S 40/44 136/248 |
| 2012/0151917 A1 * | 6/2012 | Ungerer | .................... | F01K 3/18 60/641.15 |
| 2013/0285380 A1 * | 10/2013 | Afremov | .................... | F24J 2/07 290/52 |
| 2013/0327051 A1 * | 12/2013 | Carroni | .................. | F01K 23/10 60/772 |
| 2015/0372640 A1 * | 12/2015 | Yang | ....................... | H02S 40/22 136/248 |

OTHER PUBLICATIONS

Written Opinion of the International Searching Authority; PCT/US2012/040690; Mailed Nov. 27, 2014; 6 Pages.
Notification of Transmittal of the International Search Report of the International Searching Authority, or the Declaration; PCT/US2012/040690; Mailed Nov. 27, 2014; 5 Pages.

* cited by examiner

SOLAR ENERGY DRIVEN SYSTEM FOR HEATING, COOLING, AND ELECTRICAL POWER GENERATION INCORPORATING COMBINED SOLAR THERMAL AND PHOTOVOLTAIC ARRANGEMENTS

BACKGROUND OF THE INVENTION

The subject matter disclosed herein relates to solar energy systems. More specifically, the subject disclosure relates to solar energy driven systems for cooling, heating and electrical power generation.

Solar energy-driven systems are known that, for example, produce electrical power, or that heat water for heating of a structure, for example a dwelling. These systems, however, do not provide high utilization of the solar thermal energy and corresponding system performance. The unutilized thermal energy is lost as, for example, excess heat. The art would well-receive an improved solar energy driven system providing increased utilization of the solar thermal energy.

BRIEF DESCRIPTION OF THE INVENTION

According to one aspect of the invention, a solar energy driven electrical power generation, cooling and heating system includes a solar energy receiver configured to collect solar thermal energy. A vapor generator is operably connected to the solar energy receiver. A vapor turbine is operably connected to the vapor generator and is configured to be driven by a flow of vapor from the vapor generator. An electrical power generator is operably connected to the vapor turbine and driven thereby. A thermal conditioning system is operably connected to the vapor turbine and is driven by a flow of output vapor from the vapor turbine. The thermal conditioning system can provide both cooling and/or heating to externally connected loads.

According to another aspect of the invention, a method of power generation includes collecting solar thermal energy and generating vapor utilizing the solar thermal energy. A vapor turbine is driven by the vapor and electrical power is produced via the rotation of the vapor turbine. Output vapor from the vapor turbine is utilized to drive a thermal conditioning system.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION OF THE INVENTION

Figure 1:
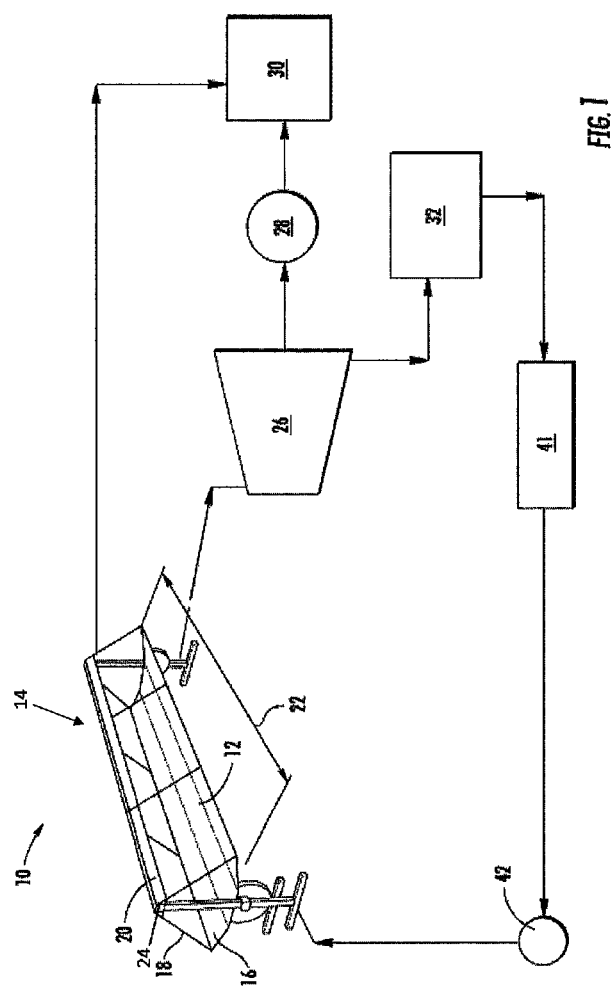
FIG. 1 is a schematic of an embodiment of a solar cooling, heating and power system.

Shown in FIG. 1 is a schematic illustration of an improved solar energy driven cooling, heating and power system 10.

The system 10 includes a solar energy concentrator 12 to concentrate and direct solar energy to a receiver 14. In some embodiments, as shown in FIG. 1, the concentrator 12 includes a trough 16 which may be a mirrored parabolic shape to concentrate and direct the solar radiation toward the receiver 14. In some embodiments, the receiver 14 is suspended over a concave portion of the concentrator 12 by a plurality of connecting rods 18.

The receiver 14 includes a thermal receiver tube or heat pipe 24 arranged along the length 22 of the receiver assembly 14. In an alternate embodiment, the receiver assembly 14 includes an array of photovoltaic cells 20 arranged along a length 22 of the receiver assembly 14. In some embodiments, the photovoltaic cells 20 are located between the concentrator 12 and the thermal receiver tube 24, but other arrangements, such as the photovoltaic cells 20 located next to the thermal receiver tube 24 are contemplated within the scope of the present disclosure. In other arrangements, the photovoltaic cells 20 are located on the concentrator surface 12.

The solar thermal energy directed at the thermal receiver tube 24 by the concentrator 12 produces vapor, for example, steam in the thermal receiver tube 24. In some embodiments, the vapor produced is at between 120 and 300 degrees Celsius. In other embodiments, the vapor produced is between about 180 and 220 degrees Celsius. The vapor is at a suitable pressure to then be utilized to drive a vapor turbine 26. The vapor turbine 26 drives a generator 28 to produce electrical power. In one embodiment, solar radiation is also collected by the photovoltaic cells 20 to produce electrical power. Electrical power generated by the electrical generator 28 and/or photovoltaic cells 20, can be transmitted to an electrical grid 30 or other, specific end use.

Referring again to FIG. 1, vapor is provided at sufficiently high pressure to drive the vapor turbine 26. The supply pressure will depend on the particular vapor turbine 26 used. The vapor turbine 26 serves to reduce the pressure of the vapor in the process of driving the electrical generator 28. The low pressure output vapor from the vapor turbine 26 is then routed, or cascaded, to a thermal conditioning system 32. The thermal conditioning system 32 may be a double effect absorption chiller where sufficient thermal quality input is available or a single-effect absorption chiller or the low stage of a double effect chiller, depending on the pressure and temperature of the output vapor from the vapor turbine 26. Other thermally activated technologies such as adsorption chillers or desiccant systems can also be used in the low pressure side of the system downstream of the vapor turbine 26.

The system 10 may include a wide range of ratings and capacities for electrical power generation and cooling capacity or refrigeration tons (RT) of cooling provided. For example, a system 10 with a field or array of concentrators 12, used for a large building, group of buildings or a district, may be rated at scales up to 1 Megawatt (MWe) and 2000-2500 Refrigeration Tons (RT) or larger. A smaller system 10, for a single building or for supplemental use may be rated at scales of 275 kWe and 500-700 RT. Further, still smaller systems 10 may be utilized for residential home use. Systems 10 are fully scalable within the availability of turbine units 26 and thermal conditioning systems 32 and with a ratio of electrical power to cooling power in similar relative proportions to maximize utilization of available input solar resources. It is to be appreciated that the ratings provided herein are merely exemplary and other combinations of ratings may be arrived at depending upon the specifications of a particular system 10. The examples provided are expected to have an overall thermal utilization of between 70% and 95% effectiveness when sized and integrated appropriately.

The system 10 described herein cascades the collected solar thermal energy, in the form of vapor, from the thermal receiver tube 24 through the vapor turbine 26 and through the thermal conditioning system 32. In the water based system shown in FIG. 1, vapor or water output from the thermal conditioning system 32 is passed through a condenser and cooler 41 to return the fluid to a sufficiently cooled liquid state, is pressurized by a pump 42 and is then returned to the thermal receiver tube 24 for reheating thus closing the thermodynamic cycle. Such a system 10 results in a much higher utilization of the solar thermal energy than systems of the prior art. For example, a system utilizing only a turbine 26 to electrical generator 28 may have half to one third of the thermal resource utilization of the present invention.

Figure 2:
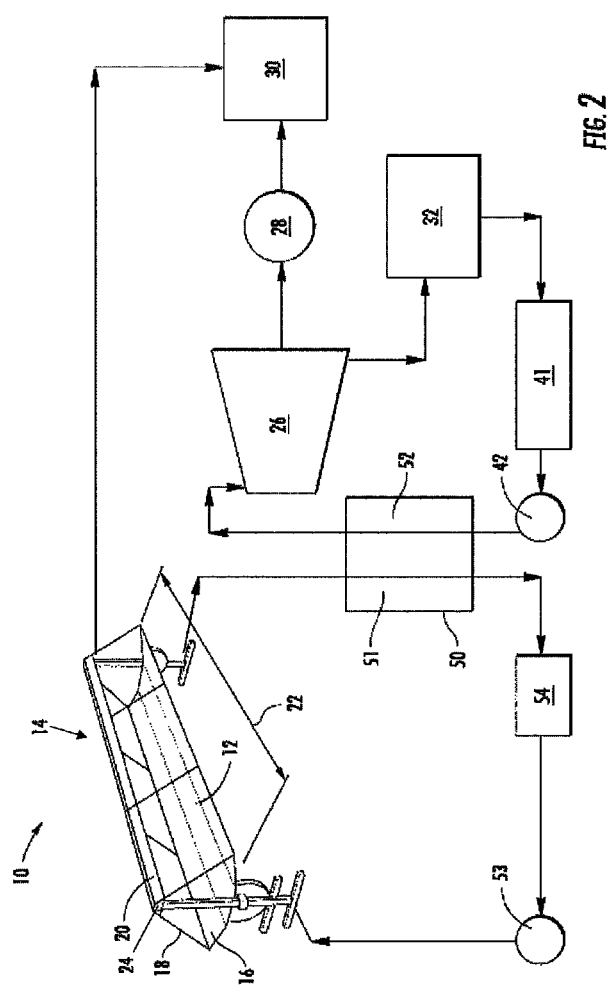
FIG. 2 is a schematic of another embodiment of a solar cooling, heating and power system.

In another embodiment, shown in FIG. 2, the thermal receiver tube 24 utilizes a flow of thermal heat transfer fluid such as a high temperature oil to absorb solar energy and transport this energy to a primary side 51 of a separate vapor generator 50. The high temperature thermal transfer fluid is utilized by the vapor generator 50 to provide vapor at a secondary side 52 of the vapor generator which is then routed to the vapor turbine 26 as previously described with regard to FIG. 1.

In a primary-secondary system, such as shown in FIG. 2, thermodynamic cycle closure of the secondary or water side of the cycle is accomplished in the same manner as described above with regard to FIG. 1, with the water passing through cooler or condenser 41 and pump 42 to return to the vapor generator 50. In this case, the thermal transfer fluid on the primary side 51 need only be cooled sufficiently in cooler 54 to allow suitable inlet temperature to transfer pump 53. Other arrangements for preheating and post-cooling working fluids are also anticipated to allow further systems integration while conforming to the basic principles taught here.

Figure 3:
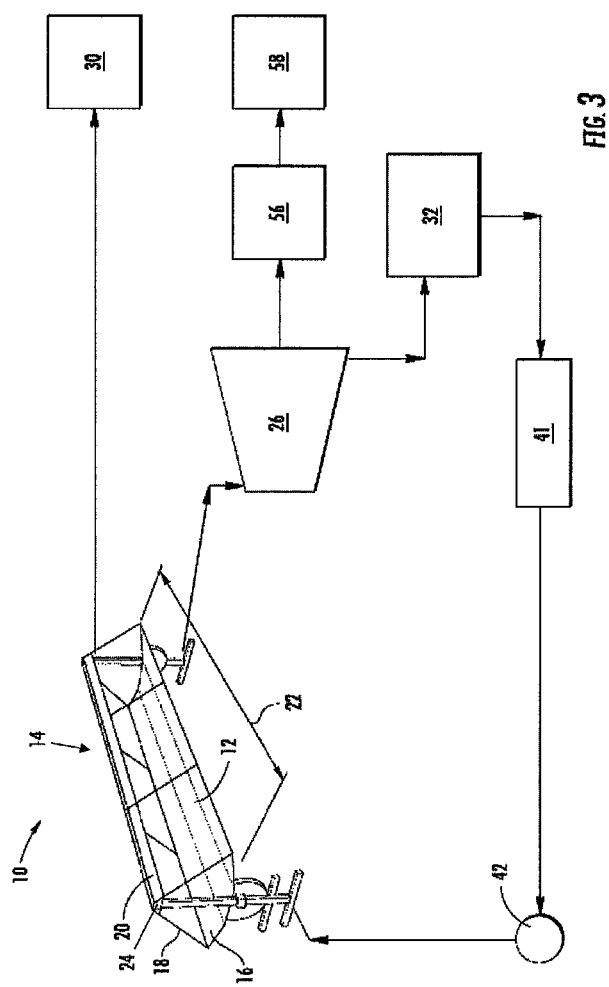
FIG. 3 is a schematic of yet another embodiment of a solar cooling, heating and power system.

In an alternate embodiment, shown in FIG. 3, the vapor turbine 26 is used to drive a mechanical refrigerant compressor 56 associated with an alternate thermal conditioning system 58. This configuration can be used in addition to or instead of the vapor turbine 26 to electrical generator 28 system of FIG. 1 or FIG. 2 and can also be followed by the thermal conditioning system 32 as previously described.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A solar energy driven power generation system comprising:
    a first circuit through which a first heat transfer fluid is circulated, the first circuit including a solar energy receiver configured to collect solar thermal energy and transfer the solar thermal energy to the first heat transfer fluid flowing therethrough;
    a second circuit through which a second heat transfer fluid is circulated, the second circuit including:
        a vapor turbine driven by a flow of second heat transfer fluid vapor therethrough;
        an electrical power generator operably connected to the vapor turbine and driven thereby;
        a thermal conditioning system in fluid communication with the vapor turbine and located fluidly downstream therefrom and driven by a flow of output second heat transfer fluid vapor or liquid from the vapor turbine; and
        a cooler disposed fluidly downstream of the thermal conditioning system to reduce a temperature of the second heat transfer fluid output from the thermal conditioning system;
    a vapor generator through which both the first heat transfer fluid and the second heat transfer fluid are directed for thermal energy exchange between the first heat transfer fluid and the second heat transfer fluid, thereby converting the second heat transfer fluid into the second heat transfer fluid vapor; and
    a plurality of photovoltaic cells disposed at the solar energy receiver, the plurality of photovoltaic cells collecting solar radiation and transmitting electrical power to an electrical grid; wherein the thermal conditioning system is one of: an absorption chiller, an adsorption chiller, a vapor driven vapor compression chiller, and a desiccant system.

2. The system of claim 1, wherein the receiver comprises a concentrator having a mirrored parabolic shape.

3. The system of claim 2, wherein the receiver further comprises a receiver tube disposed over a concave portion of the concentrator.

4. The system of claim 1, wherein vapor is produced by the vapor generator at a temperature of between about 120 degrees and about 300 degrees Celsius.

5. The system of claim 4, wherein vapor is produced by the vapor generator at a temperature of between about 180 degrees and about 220 degrees Celsius.

6. The system of claim 1, wherein the electrical power generator is operably connected to the electrical grid.

7. A method of power generation comprising:
    collecting solar thermal energy at a solar energy receiver having a first heat transfer fluid flowing thereat;
    transferring the solar thermal energy to the first heat transfer fluid;
    transferring thermal energy from the first heat transfer fluid to a second heat transfer fluid at a vapor generator, thereby converting the second heat transfer fluid into a vapor;
    driving a vapor turbine with the vapor;
    producing electrical power via an electrical generator driven by rotation of the vapor turbine;
    utilizing output vapor or hot liquid from the vapor turbine to drive a thermal conditioning system;
    collecting solar radiation energy at a plurality of photovoltaic cells disposed at the solar energy receiver; and
    transmitting electrical power from the plurality of photovoltaic cells to an electrical grid; wherein the thermal conditioning system is one of: an absorption chiller, an adsorption chiller, a vapor driven vapor compression chiller, and a desiccant system.

8. The method of claim 7, further comprising generating the vapor at a temperature between about 120 degrees and about 300 degrees Celsius.

9. The method of claim 8, further comprising generating the vapor at a temperature between about 180 degrees and about 220 degrees Celsius.

10. The method of claim 7, further comprising routing the electrical power from the electrical generator to the electricity grid.

* * * * *